United States Patent
Cahill, III

(10) Patent No.: US 8,310,501 B2
(45) Date of Patent: *Nov. 13, 2012

(54) ANALYZING ALPHA VALUES FOR FLICKER FILTERING

(75) Inventor: Benjamin M. Cahill, III, Ringoes, NJ (US)

(73) Assignee: Intel Corporation, Santa Clara, CA (US)

( * ) Notice: Subject to any disclaimer, the term of this patent is extended or adjusted under 35 U.S.C. 154(b) by 10 days.

This patent is subject to a terminal disclaimer.

(21) Appl. No.: 13/181,877

(22) Filed: Jul. 13, 2011

(65) Prior Publication Data

US 2011/0267537 A1     Nov. 3, 2011

Related U.S. Application Data

(63) Continuation of application No. 11/508,705, filed on Aug. 23, 2006, now Pat. No. 7,999,824, which is a continuation of application No. 09/703,162, filed on Oct. 31, 2000, now Pat. No. 7,119,815.

(51) Int. Cl.
*G09G 5/02* (2006.01)
*G09G 5/00* (2006.01)

(52) U.S. Cl. ........................................ 345/592; 345/629

(58) Field of Classification Search .................. 345/592, 345/629
See application file for complete search history.

(56) References Cited

U.S. PATENT DOCUMENTS

| | | | |
|---|---|---|---|
| 5,206,729 A | 4/1993 | Nakata et al. | 348/594 |
| 5,384,912 A | 1/1995 | Ogrinc et al. | 345/501 |
| 5,734,851 A | 3/1998 | Leatherman et al. | 715/771 |
| 5,929,935 A | 7/1999 | Young et al. | |
| 5,990,965 A | 11/1999 | Herz et al. | 348/446 |
| 6,067,120 A | 5/2000 | Horikawa et al. | 348/447 |
| 6,130,723 A | 10/2000 | Medin | 348/607 |
| 6,144,365 A | 11/2000 | Young et al. | 345/600 |
| 6,259,487 B1 | 7/2001 | Bril | 348/553 |
| 6,266,100 B1 | 7/2001 | Gloudemans et al. | 348/587 |
| 6,281,873 B1 | 8/2001 | Oakley | 345/418 |
| 6,320,619 B1 | 11/2001 | Jiang | 348/447 |
| 6,327,003 B1 | 12/2001 | Vos | 348/569 |
| 6,346,970 B1 | 2/2002 | Boehlke | 348/447 |
| 6,396,473 B1 | 5/2002 | Callahan et al. | 345/530 |
| 6,421,097 B1 | 7/2002 | O'Rourke | 348/607 |
| 6,538,656 B1 | 3/2003 | Cheung et al. | 345/519 |
| 6,545,724 B1 | 4/2003 | Gryskiewicz | 348/597 |
| 6,570,626 B1 | 5/2003 | Mendenhall et al. | 348/569 |
| 6,646,686 B1 | 11/2003 | Gryskiewicz et al. | 348/584 |
| 6,700,588 B1 | 3/2004 | MacInnis et al. | |
| 6,944,877 B1 | 9/2005 | Lord et al. | |
| 7,119,815 B1 * | 10/2006 | Cahill, III | 345/629 |
| 7,999,824 B2 * | 8/2011 | Cahill, III | 345/592 |

* cited by examiner

*Primary Examiner* — Amr Awad
*Assistant Examiner* — Andre Matthews
(74) *Attorney, Agent, or Firm* — Trop, Pruner & Hu, P.C.

(57) ABSTRACT

A flicker filter is adjusted according to degree of alpha blending performed on a display signal. For some weakly showing graphics images, a lower flicker filter level may be implemented or the flicker filter may be turned off. A threshold for turning off the flicker filter may be programmable. Other embodiments are described and claimed.

19 Claims, 6 Drawing Sheets

| alpha value | flicker filter level |
|---|---|
| 0 - 32 | 0 |
| 33 - 40 | 1 |
| 41 - 48 | 2 |
| 49 - 56 | 3 |
| 57 - 64 | 4 |
| 65 - 72 | 5 |
| 73 - 80 | 6 |
| 81 - 255 | 7 |

FIGURE 5

| alpha value | flicker filter level |
|---|---|
| 0 - 80 | 0 |
| 81 - 88 | 1 |
| 89 - 96 | 2 |
| 97 - 104 | 3 |
| 105 - 112 | 4 |
| 113 - 120 | 5 |
| 121 - 128 | 6 |
| 129 - 255 | 7 |

FIGURE 7

ANALYZING ALPHA VALUES FOR FLICKER FILTERING

This application is a continuation of U.S. patent application Ser. No. 11/508,705 filed on Aug. 23, 2006 now U.S. Pat. No. 7,999,824, which is a continuation of U.S. patent application Ser. No. 09/703,162 filed Oct. 31, 2000, now U.S. Pat. No. 7,119,815, the content of which is hereby incorporated by reference.

BACKGROUND

Embodiments of the invention relate to mixing graphics and video and, more particularly, to selective use of flicker filtering operations.

Motion video signals such as television programming may be combined with static signals generated by a processor-based system. The static signals are known as personal computer (PC) graphics signals, or simply graphics signals. The combined signal may be viewed on a television monitor.

A set-top box is a processor-based system that employs a television display instead of a computer monitor for viewing video signals, PC graphics signals, or a combination of the two. The set-top box may execute application software, such as electronic mail programs, connect to a data network, such as the Internet using browser software, and receive and display television programming signals.

Set-top boxes may combine a broadcast video signal with a graphics signal. The set-top box receives the video signal from an external source, such as via a coaxial cable, and mixes the signal with the PC graphics signal, typically generated from within the set-top box.

The set-top box may employ alpha values when combining the video signal with the PC graphic signal. Where a pixel, or picture element, results from the combination of a video element and a PC graphics element, an alpha value describes the weight of the elements, usually expressed as a percentage. The resulting pixel may be solid graphics, transparent graphics with video, solid video, and so on. The combining operation is known as alpha blending.

The television display receives video signals as a series of alternating fields: an odd field consisting of odd lines followed by an even field consisting of even lines, for example. The signal received by the television display is known as interlaced video. One odd field plus one even field constitutes a frame of the video signal.

One phenomenon of interlaced transmission is flickering. Flickering occurs when the video image includes small graphic detail, such as a single horizontal line, or other fine detail. For example, in an image including the letter "A", the horizontal line in the letter may flicker as every other field is being displayed. Where the small detail (the horizontal line) appears in only one field, the line comes, then goes, as alternating odd and even fields are displayed.

Flicker filtering enhances graphics displayed on an interlaced monitor, such as a household television set. Flicker filtering blends pixels from scan lines of a field with adjacent scan lines from an associated, or opposite polarity, field. Thus, for example, where small graphic detail occupies a single scan line in an odd field, scan lines that would be displayed adjacent to the scan line in an even field may be updated to also include a weighted portion of the small graphic detail. By blending adjacent scan lines, the small detail image remains visible on the display, and flickering is lessened.

Flicker filtering may adversely affect motion video images, however. While the flicker filter generally may improve the appearance of the static graphics image, flicker filtering may also blur the detail of the video image. Further, flicker filtering allows images from two different instances of time (e.g., odd field, and even field) to "appear" on the display simultaneously. This tends to blur the image in time, particularly for moderately fast horizontal pans and action-laden scenes. Thus, although flicker filtering is beneficial for graphics images, it may diminish image quality for video images.

Thus, there is a continuing need to analyze the alpha blending value before performing flicker filtering operations.

BRIEF DESCRIPTION OF THE DRAWINGS

FIG. 5 is a table associating alpha values with flicker filter levels according to one embodiment of the invention.

FIG. 7 is a table associating the alpha values with the flicker filter levels following the software operations of FIG. 6 according to one embodiment of the invention.

DETAILED DESCRIPTION

In accordance with the embodiments described herein, a flicker filter is adjusted when certain alpha blending operations occur. The operations specify the strength of a graphics signal to be displayed simultaneously with a video signal. For some weakly showing graphics signals, the flicker filter may be turned off entirely.

Figure 1:
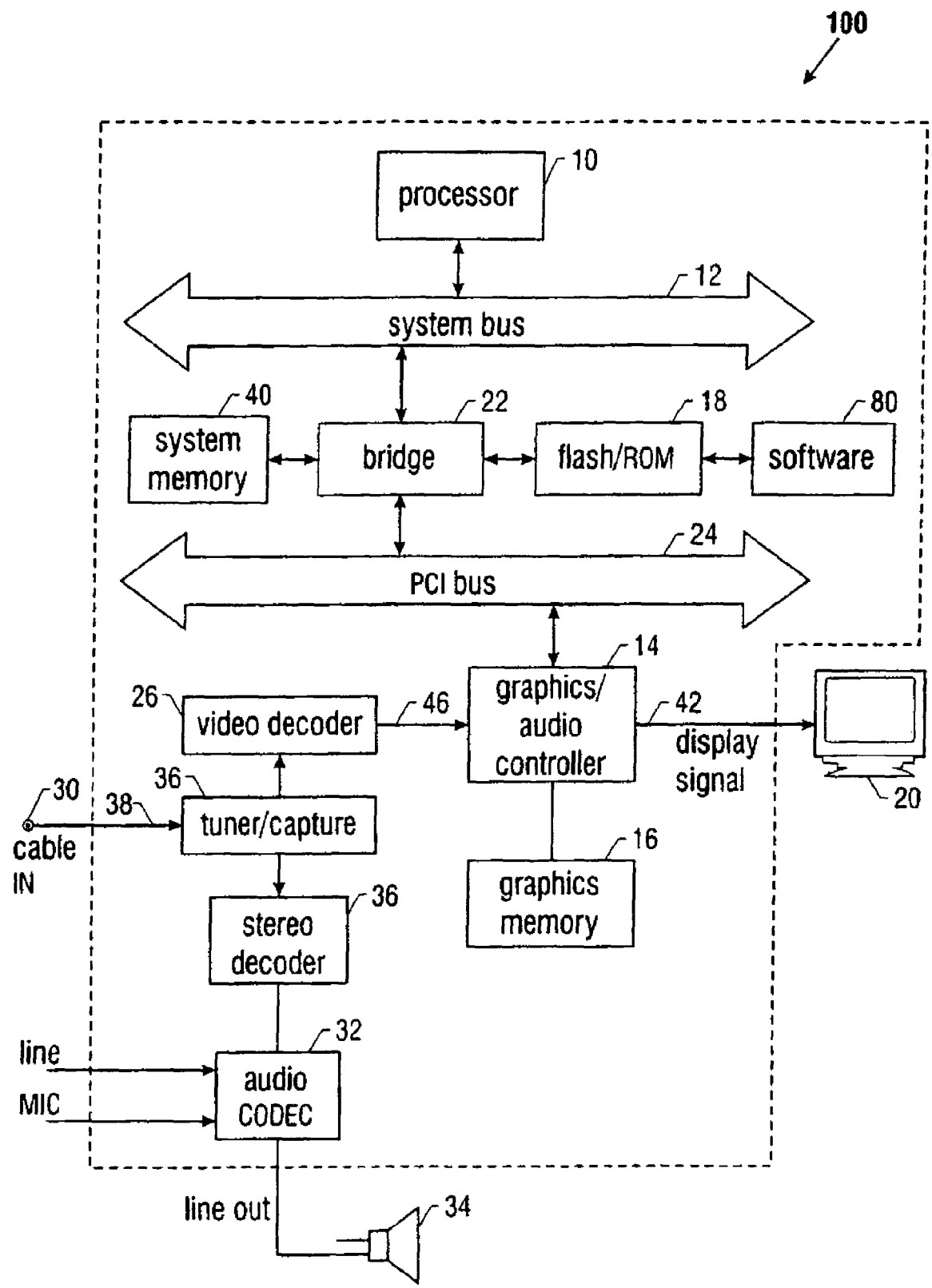
FIG. 1 is a block diagram of a system according to one embodiment of the invention.

In FIG. 1, a system 100 includes a processor 10 connected to a system bus 12, according to one embodiment. The system 100 may be any of a variety of processor-based systems, including a personal computer, an Internet appliance, a set-top box, and so on. A multi-function bridge 22 is connected to the system bus 12. The bridge 22 may itself include memory control functions. In one embodiment, the bridge 22 interfaces to a system memory 40 as well as a flash/ROM 18.

The memory 40 may be a random access memory (RAM) such as dynamic random access memory (DRAM), synchronous DRAM (SDRAM), static RAM (SRAM), a Rambus® DRAM (RDRAM), or other suitable volatile media. The flash/read-only memory (ROM) 18 may store one or more software programs 80, for execution by the processor 10.

In one embodiment, the bridge 22 is further connected to a peripheral component interconnect (PCI) bus 24. The PCI Specification is available from The PCI Special Interest Group, Portland, Oreg. 97214. The PCI bus is a high-performance bus for connecting I/O processors, buses, controllers, and the like.

The system 100 further includes a graphics controller 14, coupled to the PCI bus 24. In one embodiment, a Tvia Cyber-Pro™ 5000 streaming media processor, suitable for set-top boxes and Internet appliances, available from Tvia Technologies, Inc., Santa Clara, Calif., is operable as the graphics controller 14.

The graphics controller 14 may include circuitry for performing a variety of video operations. The graphics controller 14 may include graphics engines, for rendering graphics images, an alpha blender, a video mixer, a video scaler, a color burst generator, a pixel clock, an analog television encoder, and a flicker filter, to name but a few possible components. Furthermore, the elements may be combined, such as where the television encoder also includes a color burst generator. The described features are illustrative only.

A video signal 38 may be received into the system 100 through a cable or other connector IN 30. In one embodiment, the video signal 38 is received into a tuner/capture device 28, which converts radio frequency (RF) signals into baseband composite video, for receipt by a video decoder 26. The video decoder 26 decodes the baseband video signal and digitizes the signal into luma and chroma components. The components may then be received into the graphics controller 14 using a dedicated video port. The graphics controller 14 may send the components into a graphics memory 16, also known as a frame buffer memory 16. Alternatively, the graphics controller 14 may bypass the frame buffer memory 16, such as for performing real-time processing operations.

In one embodiment, the system 100 further includes a stereo decoder 36. The stereo decoder 36 receives the baseband composite video signal from the tuner/capture card 28, and decodes baseband sound signals into stereo, for receipt by an audio encoder/decoder (codec) 32. The audio codec 32 may connect to a speaker 34 that, in one embodiment, is external to the system 100.

In one embodiment, the graphics controller 14 produces graphics signals. The internally generated graphics signal may be mixed with the incoming video signal, such as in a video mixer or an overlay, for example (not shown). Whether mixed or not, an outgoing, or display signal 42 is received by a television monitor 20, which is external to the system 100 according to one embodiment.

Thus, the display signal 42 may be a video signal received into the system 100 by the cable IN 30, a graphics signal generated inside the system 100, a combination of the video and graphics signals, a combination of multiple video signals, and so on. The term "display signal" is used throughout this document to identify any possible signal that is made suitable for receipt by the television monitor 20.

Increasingly, analog video signals from an external source are combined with graphics signals typically created within the set-top box, or other processor-based system, before being displayed. For example, a graphics image may be superimposed on a video image such that both are visible simultaneously. Some television networks, for example, display an identification icon in the lower right-hand corner of the television display while a program is broadcast. The graphics icon is typically transparent enough that the video image is not disturbed. Graphics images may include fine detail, such as with text, or may be coarse, such as with a blue background co-incident with scrolling stock quotes.

As explained in the background, television displays expect incoming signals to be interlaced. That is, an odd field of the video signal 42 is received, followed by an even field, and so on. The television display raster includes hundreds of scan lines. When the odd field is received, the television monitor 20 displays the odd scan lines; when the even field is received, the television monitor 20 receives the even scan lines.

The television monitor 20 receives these odd and even fields several times each second. For example, according to the Television Standard of the National Television Systems Committee (NTSC), an interlaced color composite signal includes 525 scan lines, is interlaced 2:1, and has a 59.95 Hz field rate (NTSC, 1953). According to the Phase Alternation by Line (PAL) standard, an interlaced color composite signal has 625 scan lines and a 50 Hz field rate (PAL, 1967).

Figure 2:
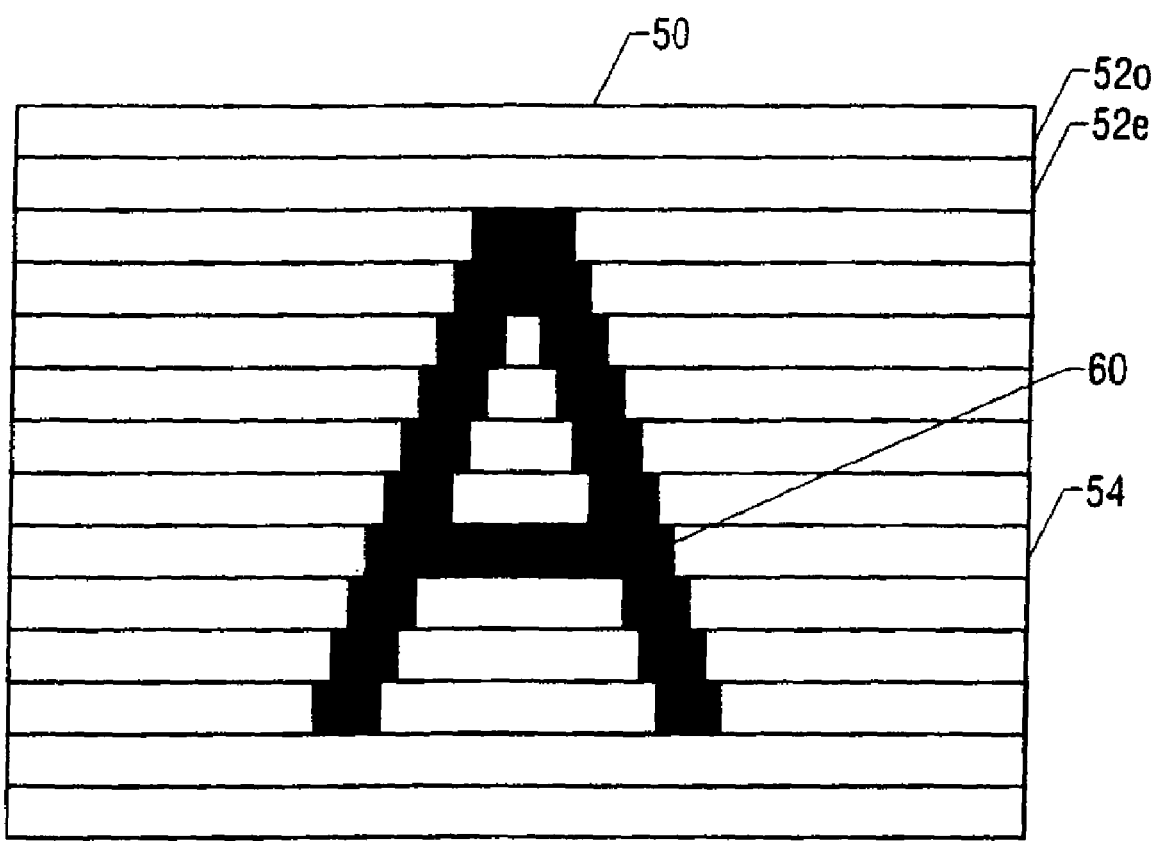
FIG. 2 is a diagram of a display illustrating a fine graphics image according to one embodiment of the invention.

Particularly for still images, interlaced display of graphics signals may cause a noticeable flicker of the image. A flicker results when part of the image occupies a single scan line, such as an image having thin, horizontal lines. In FIG. 2, for example, a text letter "A" occupies a number of scan lines 52 of a display 50. The scan lines 52 include odd scan lines 52$o$ and even scan lines 52$e$.

The letter "A" includes two diagonal lines, meeting at the top, and a horizontal line 60 connecting approximately in the middle, between the two diagonal lines. The horizontal line 60 that forms a part of the "A" occupies a single scan line 54.

Figure 3A:
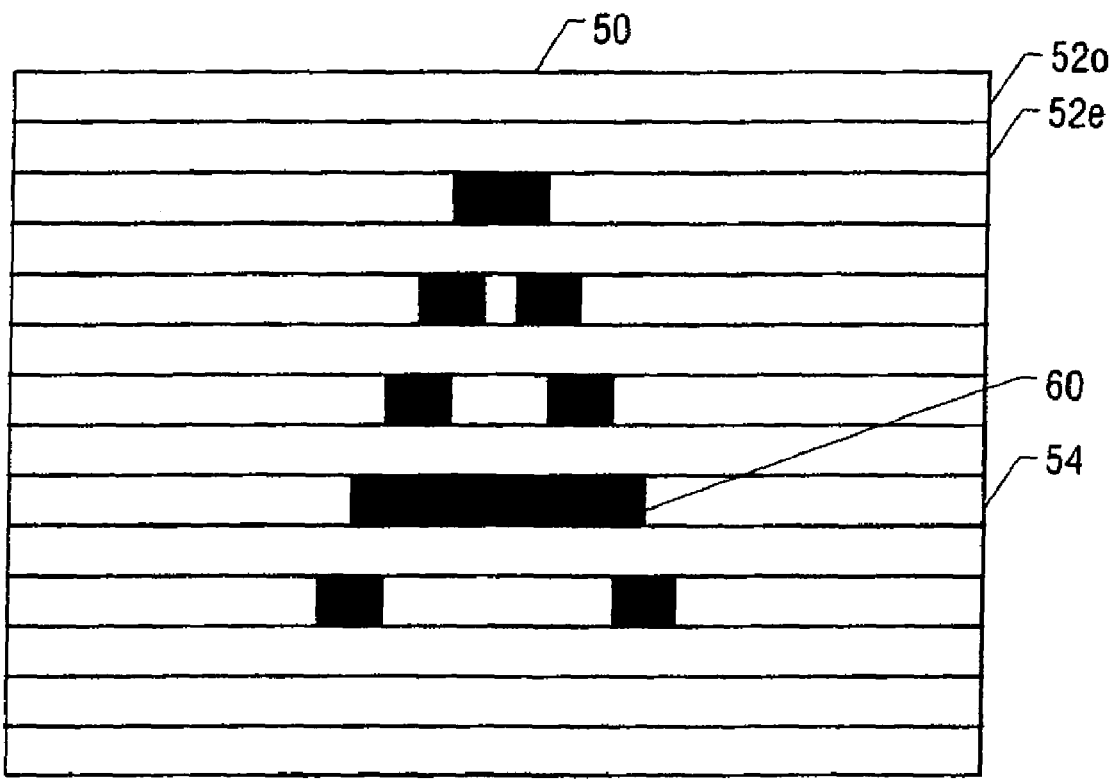
FIGS. 3A and 3B are diagrams illustrating the display when alternate fields are visible according to one embodiment of the invention.
Figure 3B:
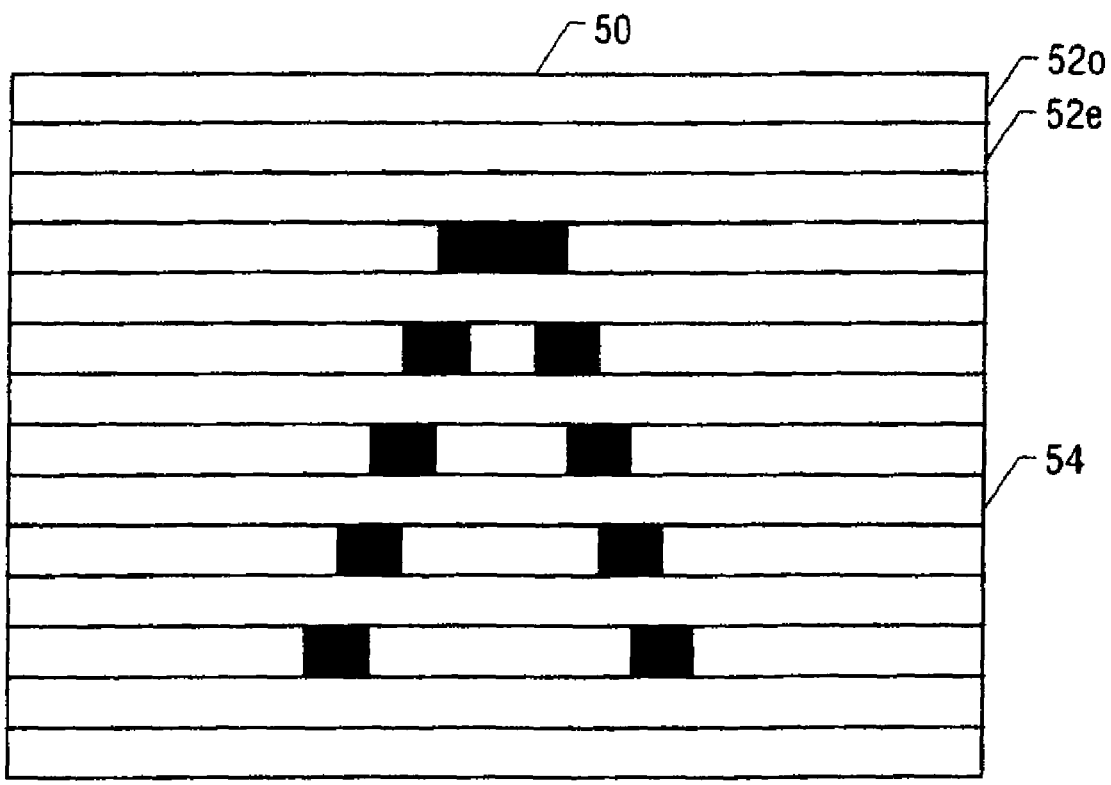

In FIG. 3A, the odd scan lines 52$o$ of the "A" are sent to the display 50. In this image, the horizontal line 60 of the "A," in scan line 54, is visible. In FIG. 3B, however, only the even scan lines 52$e$ of the display 50 receive signal information. Now, the horizontal line 60 is not visible. Accordingly, displaying the image of FIG. 3A, followed rapidly by the image of FIG. 3B, produces flicker. (The diagonal components of the "A" likewise may produce flicker, but tend to be less noticeable than the horizontal line 60.)

To address this phenomenon, a flicker filtering operation may be performed on the signal to be displayed, typically from within the graphics controller 14. Flicker filtering blends pixels from scan lines of a given field with adjacent scan lines from one or more opposite fields. The blending reduces flicker caused by small graphics detail, such as the single horizontal line 60. Where originally the small detail appears in only one field, the flicker filtering makes the detail "appear" in both fields.

Figure 4:
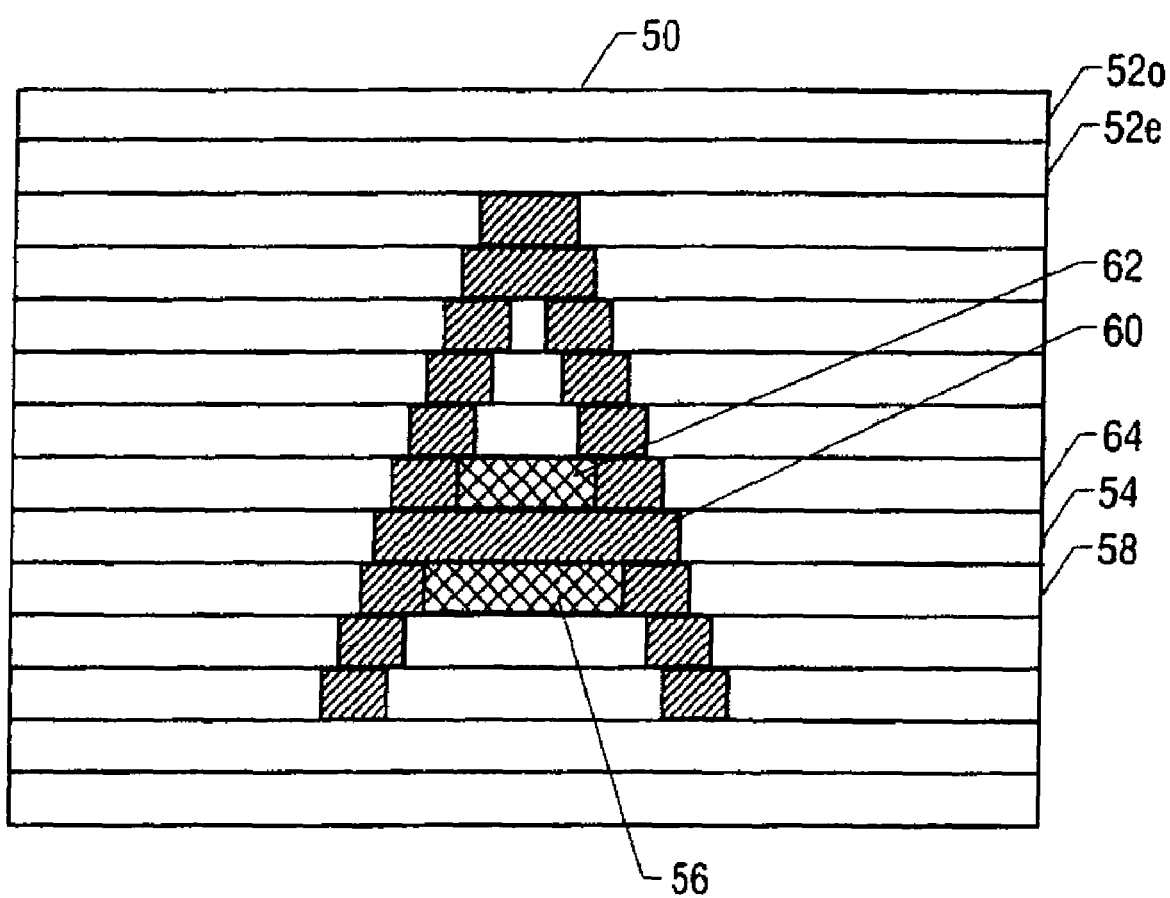
FIG. 4 is a diagram of the fine graphic image following a flicker filtering operation according to one embodiment of the invention.

In FIG. 4, the "A" is shown, this time following flicker filtering. A scan line 58 includes a gray horizontal line 56. Likewise, a scan line 64 includes a gray horizontal line 62. Both horizontal lines 56 and 62 are adjacent to the horizontal line 60 in scan line 54, line 56 on one side and line 62 on the other side. The scan line 58 and the scan line 64 include both diagonal components of the "A" and a gray representation of the horizontal line 60 from the adjacent scan line 54. The information that produces the flicker (the horizontal bar 60) is thus also present on the adjacent scan lines 58 and 64.

One method of flicker filtering is to employ a filter such as a finite impulse response (FIR) filter. Some flicker filters include the ability to adjust the FIR filter, for example, by increasing the number of taps, or by adjusting the weight of each tap. The FIR flicker filter thus may include multiple levels or strengths.

While flicker filtering may mitigate the flickering effects of interlaced graphics, flicker filtering also may disturb motion video such as a movie or television program. After flicker filtering, the static video detail of a movie may be blurred. Further, because flicker filter uses information from an adjacent field, images from two different instances in time may "appear" on the display simultaneously, blurring the image in time. Such is particularly evident in moderately fast horizontal pans or in action-oriented scenes.

In some prior art systems, flicker filtering is performed for all types of display signals, whether graphics, video, or mixed video and graphics signals. For other systems, an option may permit flicker filtering to be turned on or off, as desired.

According to one embodiment, flicker filtering is adjusted according to the "strength" of the graphics image being displayed. In other words, an assessment of the degree of alpha blending is made. The strength of the graphics image may be identified by the alpha value. A weakly showing, or more transparent, graphics image typically will not generate enough contrast in the combined image to induce a perception of flicker. Because flicker filtering may disturb the underlying video image, where a somewhat transparent graphics image is being displayed, the flicker filter is turned off.

In one embodiment, an eight-bit alpha value specifies the strength of a graphics image to be displayed simultaneously with a video image, for a total of two hundred and fifty-six possible "strengths." A flicker filter likewise may include eight levels of flicker filtering, according to one embodiment.

In FIG. 5, a table relates alpha values to the flicker filter levels, according to one embodiment. Alpha values from 0-32 result in flicker filter level 0, or no flicker filter, alpha values 33-40 result in flicker filter level 1, and so on. Alpha values 91-255 invoke the highest flicker filter level, level 7, according to one embodiment. In the mid-range, the flicker filter level increases for every eight increments of the alpha value. The "alpha step size" is thus eight for this flicker filter. An alpha value of 33 represents a threshold, below which no flicker filtering is performed.

Because some transparent graphic images do not induce enough flicker to justify flicker filtering, in one embodiment, the system 100 monitors the alpha value and adjusts the flicker filter level, as needed, for low alpha values. The monitoring and adjusting may, for example, be performed by the software 80 of FIG. 1. The operation of monitoring and adjusting, according to one embodiment, is depicted in the flow diagram of FIG. 6.

The alpha value associated with the current image being sent to the display is compared to a predefined threshold value (diamond 82). In one embodiment, this threshold value is empirically determined to be the alpha value below which no flicker filtering is to be performed. In other words, the threshold identifies graphics images of sufficiently low strength that no flicker is noticeable in the absence of flicker filtering. Accordingly, by not flicker filtering, the possible adverse affects to the video image may be avoided.

In a second embodiment, the threshold value is not predetermined, but is based upon an evaluation of the image prior to being displayed. In other words, the threshold value may be generated by the software 80 based upon certain image qualities.

Where the alpha value does not exceed the predetermined threshold value (the "no" prong of diamond 82), in one embodiment, the flicker filter is turned off, or set to level "0" (block 84), and no flicker filtering is performed. Where the alpha value exceeds the predetermined threshold value (or is identical to same), however, the flicker filter may nevertheless be adjusted. For example, in one embodiment, a calculation for a new flicker filter level is performed (block 86).

Once a new filter level is calculated, the level is compared to a value corresponding to the highest flicker filter level (diamond 88). If the calculated filter level exceeds the highest level of the flicker filter, the filter level is simply set to the highest level of the flicker filter (block 90). Otherwise, the flicker filter level is adjusted according to the calculation (block 92).

Figure 6:
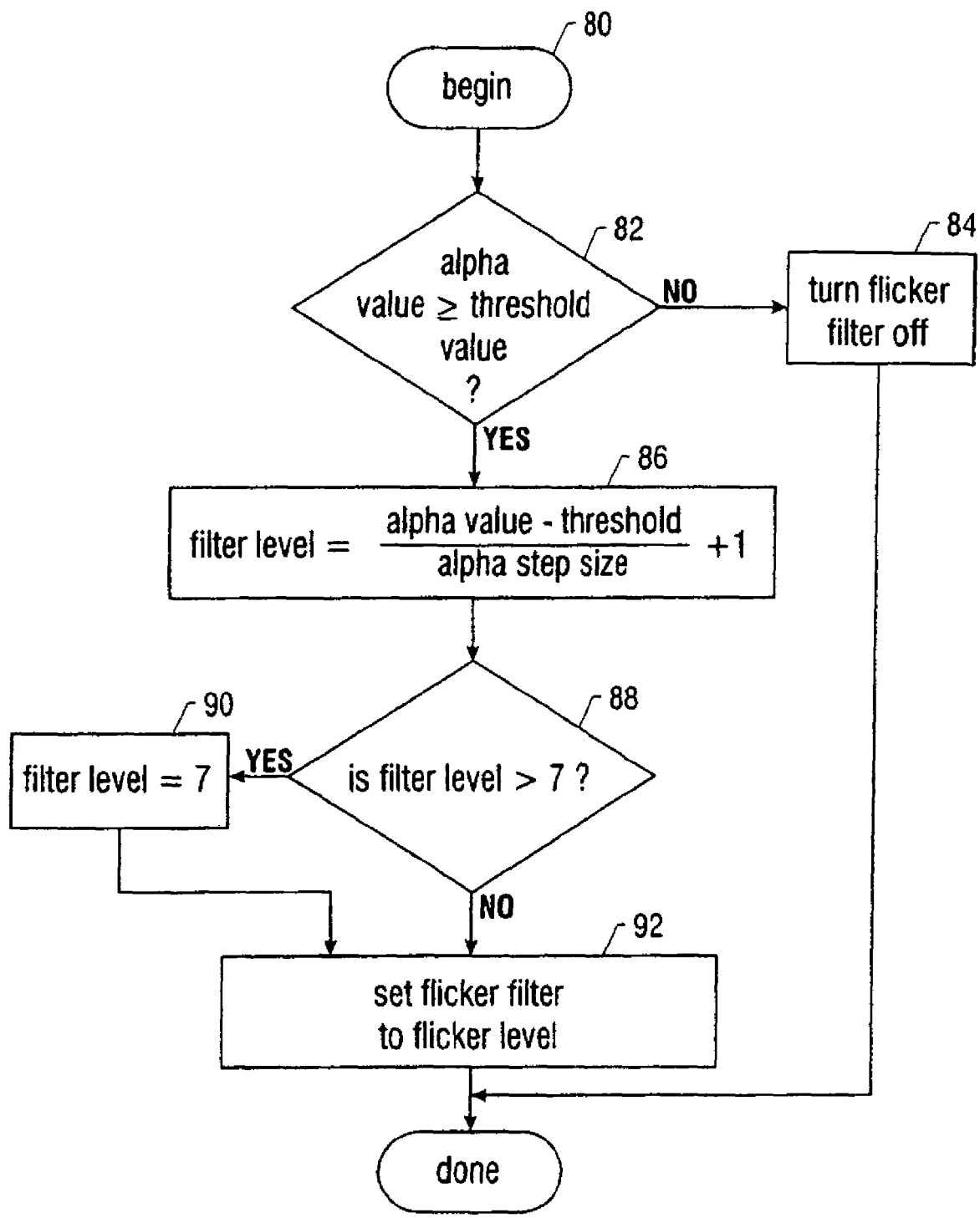
FIG. 6 is a flow diagram showing operation of the system according to one embodiment of the invention.

In FIG. 6, the predetermined threshold value is subtracted from the current alpha value. The result is divided by the alpha step size for a whole number result. A constant value of 1 is added to the whole number result. The formula is one of many possible calculations that may be performed, which relates the filter level to the alpha value. Alternatively, a lookup table may be employed which associates alpha values with the new filter levels.

A table associating the alpha values with the adjusted flicker filter levels, based upon the formula used in FIG. 6, is depicted in FIG. 7, where the alpha step size is 8 and the predetermined threshold value is 81. The eight available flicker filter levels are still invoked, but for higher alpha values, as shown.

Thus, according to the embodiments described herein, a flicker filter is adjusted based upon the strength of the graphics image to be displayed simultaneously with a video image. In one embodiment, a comparison between the alpha values and a predetermined threshold value is used to calculate the new flicker filter levels. For sufficiently low alpha values corresponding to transparent graphics images, the flicker filter is turned off entirely, in some embodiments. Accordingly, flicker filtering which is not beneficial for the graphics image is not performed, and adverse affects to the video image are avoided.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving an alpha value indicative of how a video signal received in an Internet appliance system and a graphics signal are to be combined;
   comparing the alpha value to a threshold value;
   obtaining a result of the comparison;
   subtracting the threshold value from the alpha value to arrive at a second result; and
   controlling a flicker filter based at least in part on the alpha value and the second result.

2. The method of claim 1, further comprising turning off the flicker filter if the alpha value is below the threshold value, and otherwise adjusting, based at least in part on the second result, a filter level of the flicker filter if the alpha value exceeds the threshold value.

3. The method of claim 2, further comprising adjusting the filter level of the flicker filter responsive to the result.

4. The method of claim 2, further comprising:
   dividing the second result by an alpha step value to arrive at a third result; and
   adjusting the filter level of the flicker filter based on the third result.

5. The method of claim 1, further comprising turning off the flicker filter if the graphics signal to be displayed with the video signal is substantially transparent.

6. The method of claim 1, further comprising evaluating the graphics signal to produce the threshold value.

7. A system comprising:
   a processor to execute instructions;
   a streaming media processor coupled to the processor and including a graphics engine, an alpha blender, and a flicker filter, the streaming media processor to execute a program to compare an alpha value indicative of how a video signal and a graphics signal are to be combined to a threshold value to arrive at a result, and control a filter level of a flicker filter based on the result, wherein the control is further based on subtraction of the threshold value from the alpha value to arrive at a second result, division of the second result by an alpha step value to arrive at a third result, and adjustment of the filter level of the flicker filter based on the third result; and
   a non-volatile storage coupled to the streaming media processor to store the program.

8. The system of claim 7, wherein the streaming media processor is to turn off the flicker filter if the threshold value exceeds the alpha value.

9. The system of claim 7, wherein the system comprises a set-top box.

10. The system of claim 7, wherein the system comprises an Internet appliance.

11. The system of claim 7, wherein the system is to receive a radio frequency (RF) signal including video information and to obtain the video signal from the RF signal.

12. The system of claim 11, further comprising a capture device to receive the RF signal and to convert the RF signal into a composite video signal.

13. The system of claim 12, further comprising a video decoder coupled to the capture device to receive the composite video signal and to digitize the composite video signal into digitized components for output to the streaming media processor.

14. The system of claim 7, wherein the streaming media processor is to mix the video signal with the graphics signal, wherein the streaming media processor is to generate the graphics signal.

15. An article comprising a machine-accessible storage medium including instructions that when executed cause a system to:
   receive an alpha value indicative of how a video signal and a graphics signal are to be combined;
   compare the alpha value to a threshold value;
   obtain a result of the comparison;
   subtract the threshold value from the alpha value to arrive at a second result; and
   turn off a flicker filter if the alpha value is below the threshold value, and otherwise adjust, based at least in part on the second result, a filter level of the flicker filter if the alpha value exceeds the threshold value.

16. The article of claim 15, further comprising instructions that when executed enable the system to adjust the filter level of the flicker filter responsive to the result.

17. The article of claim 15, further comprising instructions that when executed enable the system to:
   divide the second result by an alpha step value to arrive at a third result; and
   adjust the filter level of the flicker filter based on the third result.

18. The article of claim 15, further comprising instructions that when executed enable the system to turn off the flicker filter if the graphics signal to be displayed with the video signal is substantially transparent.

19. The article of claim 15, further comprising instructions that when executed enable the system to evaluate the graphics signal to produce the threshold value.

* * * * *